United States Patent [19]

Davidson et al.

[11] Patent Number: 5,112,129
[45] Date of Patent: May 12, 1992

[54] METHOD OF IMAGE ENHANCEMENT FOR THE COHERENCE PROBE MICROSCOPE WITH APPLICATIONS TO INTEGRATED CIRCUIT METROLOGY

[75] Inventors: Mark Davidson, Palo Alto, Calif.; Kalman Kaufman; Isaac Mazor, both of Haifa, Israel

[73] Assignee: KLA Instruments Corporation, San Jose, Calif.

[21] Appl. No.: 488,583

[22] Filed: Mar. 2, 1990

[51] Int. Cl.⁵ .............................................. G01B 9/02
[52] U.S. Cl. .................................. 356/359; 356/358; 382/43

[58] Field of Search ............... 356/359, 358, 357, 387; 250/560; 382/54, 50, 43

Primary Examiner—Samuel Turner
Assistant Examiner—Richard E. Kurtz, II
Attorney, Agent, or Firm—Rosenblum, Parish & Bacigalupi

[57] ABSTRACT

A method whereby the image produced in a coherence probe microscope is modified by means of a certain specific additive electronic transformation for the purpose of improving the measurement of selected features. The technique improves measurement accuracy on optically complex materials, in particular it improves the accuracy of linewidth measurement on semiconductor linewidths.

14 Claims, 13 Drawing Sheets

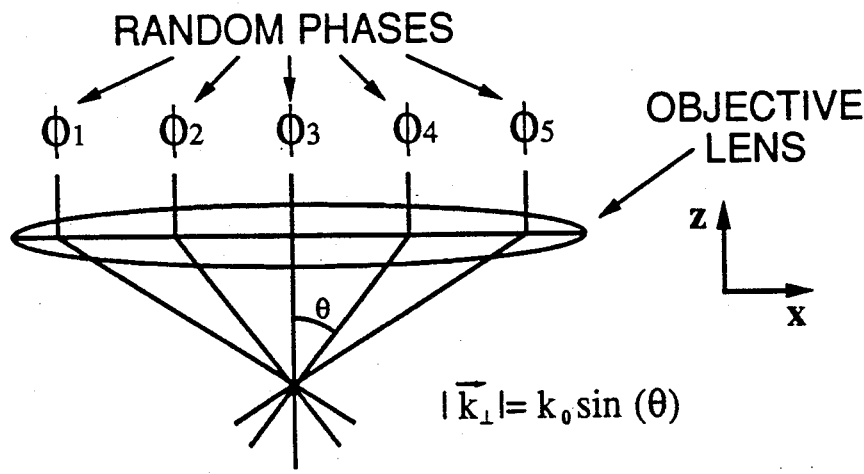

$$\vec{E}(x,z,t) = \int \frac{d^2\vec{k}_\perp}{(2\pi)^2} e^{i\vec{k}_\perp \cdot \vec{x} + ik_z z - i\omega t} \sum_{\lambda=1}^{2} \vec{\epsilon}_\lambda(\vec{k}) E_\lambda(k_\lambda) \times$$
$$\times e^{i\phi_\lambda(\vec{k}_\perp)} \theta((NA \cdot k_0)^2 - \vec{k}_\perp^2)$$

where $\omega = c|k_0|$; $k_z = \sqrt{k_0^2 - k_\perp^2}$

RANDOM PHASE APPROXIMATION:
(ASSUMES UNPOLARIZED LIGHT)

$$\langle e^{i\phi_\lambda(k_\perp)} e^{i\phi_{\lambda'}{}'(k_\perp')} \rangle = \delta^2(\vec{k}_\perp - \vec{k}_\perp') \delta_{\lambda,\lambda'}$$

MUTUAL COHERENCE:

$$\langle \vec{E}(x,z,t) \cdot \vec{E}(0,0,t) \rangle = \int d^2\vec{k}_\perp e^{i\vec{k}_\perp \cdot \vec{x} + ik_z z} \sum_{\lambda=1}^{2} E_\lambda^2(\vec{k}_\perp)$$

IF THE PUPIL IS UNIFORMLY FILLED, THEN:

$$E_\lambda^2 = \theta((NA \cdot k_0)^2 - k_\perp^2)$$

SO UP TO A MULTIPLICATIVE CONSTANT WE HAVE:

$$\langle \vec{E}(x,z,t) \cdot \vec{E}(0,0,t) \rangle = \int d^2\vec{k}_\perp e^{i\vec{k}_\perp \cdot \vec{x} + ik_z z} \theta((NA \cdot k_0)^2 - k_\perp^2) = G(x,z)$$

WHERE THE FUNCTION G IS COINCIDENTALLY
THE SAME AS THE COHERENT IMPULSE
RESPONSE FUNCTION AT Z = 0.

Fig. 3

| ORIGIN CONFIGURATION | RESULTING SIGNAL |
|---|---|
| 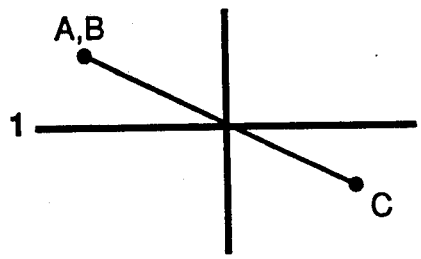 | 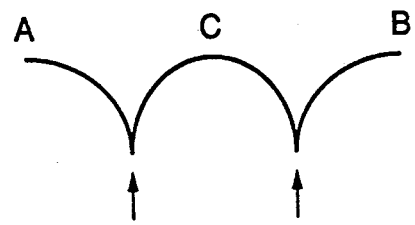 CUSP CAUSED BY THE TRAJECTORY PASSING THROUGH THE ORIGIN. |
| 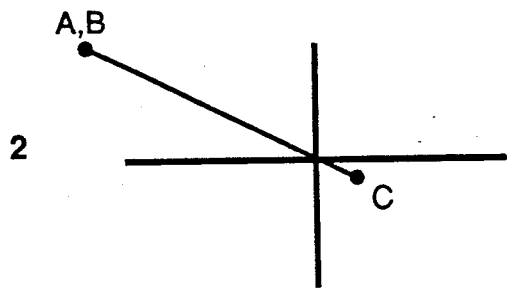 | 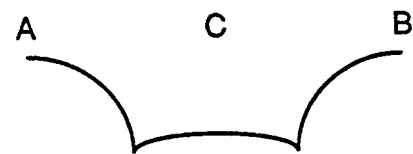 |
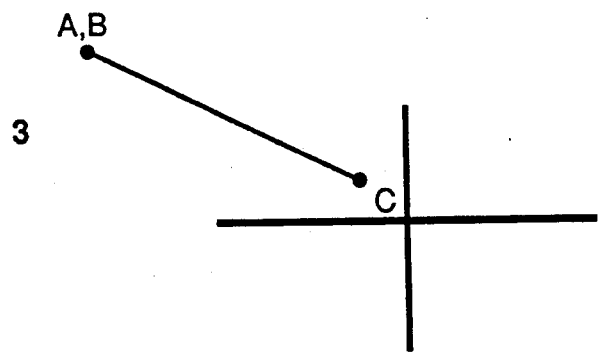
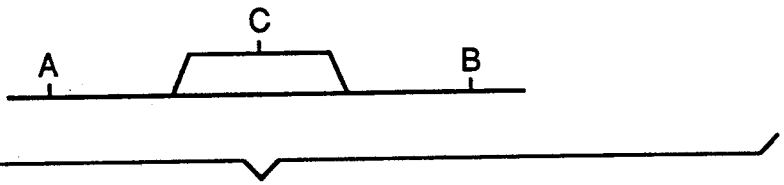
Fig. 6a

ORIGIN CONFIGURATION  RESULTING SIGNAL
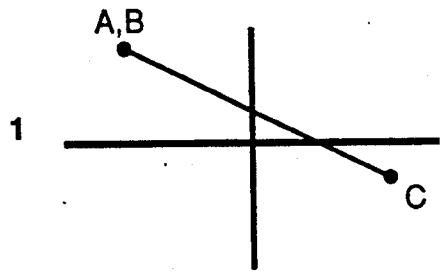
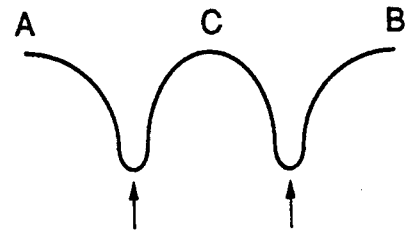
CUSP BECOMES ROUNDED BECAUSE TRAJECTORY NO LONGER PASSES THROUGH ORIGIN
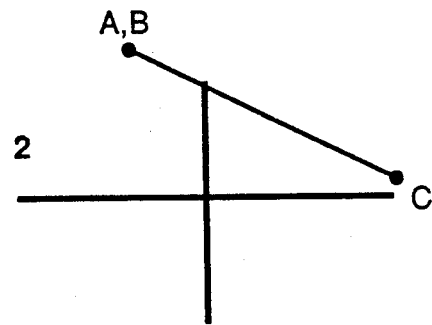
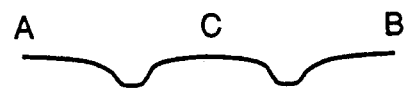
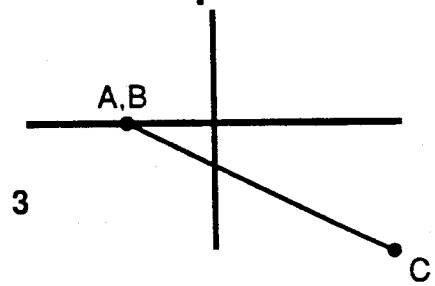
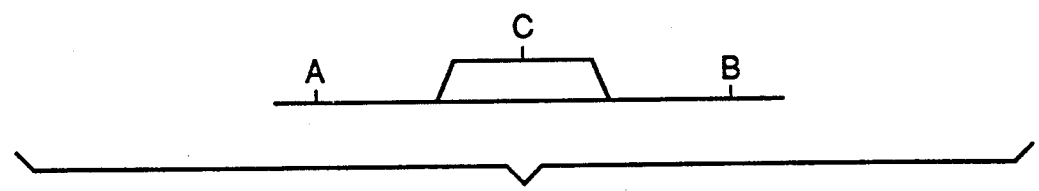
Fig. 6b

METHOD OF IMAGE ENHANCEMENT FOR THE COHERENCE PROBE MICROSCOPE WITH APPLICATIONS TO INTEGRATED CIRCUIT METROLOGY

BACKGROUND OF THE INVENTION

1. Field of the Invention

The present invention relates generally to precision optical inspection methods and apparatus, and more particularly to a method and apparatus for performing microscopic inspection and measurement of integrated circuit wafer geometry using interference microscopy in combination with electronic image processing.

2. Discussion of the Prior Art

It has long been desired that means be provided to inspect and measure the characteristics of microminiature surfaces such as those formed in integrated circuit wafers. One such characteristic of interest is the line widths of the various traces produced on a wafer surface during IC manufacture.

One prior art technique for integrated circuit metrology includes the use of an ordinary microscope with some form of electronic detector positioned at the image plane. For example, video cameras, scanning slits (see U.S. Pat. No. 4,373,817), shearing systems and linear arrays, have all been used as detectors with ordinary microscopes. However, the capability of the ordinary microscope is limited in that it can only measure the intensity of the optical wave amplitude and cannot measure the full complex amplitude including a magnitude as well as a phase. As a consequence, the three-dimensional nature of integrated circuit surfaces makes use of the classical microscope impractical for precision surface inspections and measurements of this type.

Other prior art techniques have used confocal laser scanning microscopes to obtain three dimensional data relating to integrated circuit surfaces. A rather thorough treatment of the subject may be found in T. Wilson and C. Shepard (1984), Theory and Practice of Scanning Optical Microscopy, Academic Press.

An improved prior art technique over the classical microscope is that used on what has become known as the Coherence Probe Microscope (See U.S. Pat. No. 4,818,110 Davidson and Davidson et al "An Application Of Interference Microscopy To Integrated Circuit Inspection And Metrology" Proc SPIE, vol. 775, 1987, both of which are expressly incorporated hereinto by reference.) The Coherence Probe Microscope is a form of optical microscope which uses optical images obtained from an interference microscope together with electronic processing in order to produce a synthetic image whose pixel grey scales are proportional to the absolute value of the mutual coherence function or the degree of coherence between light reflecting off of corresponding pixels in an interference microscope.

Whereas the Coherence Probe Microscope technique discussed above calculates the absolute value of the mutual coherence between the reference and object waves of a two beam interference microscope by acting directly on the images, the refinement presented here performs an additive transformation on the raw image data before calculating the coherence. The transformation adds in the signal from a single (or a set of) fixed pixels to the signals of all the other pixels. This transformation is done before calculating the absolute value of the mutual coherence, and effects a shift of the origin of the complex mutual coherence plane prior to taking the absolute value. This technique reduces some distortions in the image caused by transparent films or other causes. The distortion is reduced because the origin of the complex plane may be shifted away from the complex value of the mutual coherence for a point of interest, thereby reducing distortion caused by taking an absolute value, and desensitizing the measurement results to certain sytematic noise present in the mutual coherence data when measuring patterns in transparent films such as photoresist.

SUMMARY OF THE PRESENT INVENTION

It is therefore a principal object of the present invention to provide an improved method and apparatus for accomplishing three dimensional inspection of integrated circuits and the like.

Another object of the present invention is to provide an improved synthetic imaging technique utilizing a two beam interference microscope.

Still another object of the present invention is to provide a method and apparatus by which the top width, bottom width and height of an integrated circuit line may be accurately measured.

Briefly, a preferred embodiment of the present invention involves the use of a specially adapted Linnik microscope in combination with a video camera, a wafer transport stage and data processing electronics to form an inspection apparatus. The apparatus can utilize either broad band or narrow band light to develop a plurality of interference images taken at different axial positions (elevations) relative to the surface under investigation. This data constitutes a series of image planes. The data in these planes is transformed by an additive transformation on the video signal intensities. Then this transformed image data is used to calculate the absolute mutual coherence between the object wave and reference wave for each pixel in the transformed plane. Synthetic images are formed whose brightness is proportional to this absolute mutual coherence as the optical path length is varied.

The transform of the image data is done in order to shift the origin of the complex mutual coherence plane. There are several closely related cases to be considered:

1. Path length variation is observed by examining how the intensity of a fixed pixel fluctuates in a series of image planes. Each image plane data being taken with a different optical path length.

2. Path length variation is achieved by observing different but equivalent pixels in an image with an instrument adjusted to produce lateral interference fringes of a know periodicity. Then by knowing the spacing between pixels along the direction of the interference fringe gradient, the effect of pathlength variation can be immediately determined from the same image. The pixels used must be equivalent in the sense that their optical coherence would be identical if the lateral fringesize were adjusted to be infinite.

In order to avoid undue proliferation of cases, the term "Path length variation" shall include variations in any part of the optical path, be it in the collimated space between the beamsplitter and the objective lens, or in the "converging ray" part of the beam between the objective lens and the object or the reference mirror.

The basic idea of the present invention is to generalize the Coherence Probe Microscope to allow for complex additive offsets to the mutual coherence function which provide improved measurement capabilities in some cases. The main advantages occur when there are transparent films, such as photoresists to be measured.

Among the advantages of the present invention are that it provides for a more accurate measurement of linewidths of transparent films in many cases than the conventional Coherence Probe Microscope.

Another advantage is that in some cases the repeatability of the linewidth measurement obtained by using this invention is considerably improved over the conventional Coherence Probe Microscope.

Another advantage is that images formed using this invention will in some cases show a more accurate rendering of an object under inspection than a conventional Coherence Probe Microscope.

These and other objects and advantages of the present invention will no doubt become apparent to those skilled in the art after having read the embodiments which are illustrated in the several figures of the drawing.

IN THE DRAWING

FIG. 3 shows a calculation of mutual coherence;

FIGS. 6a and 6b are diagrams showing undesirable effects which are corrected by shifting the origin in the complex plane;

DETAILED DESCRIPTION OF THE PREFERRED EMBODIMENTS

Figure 1:
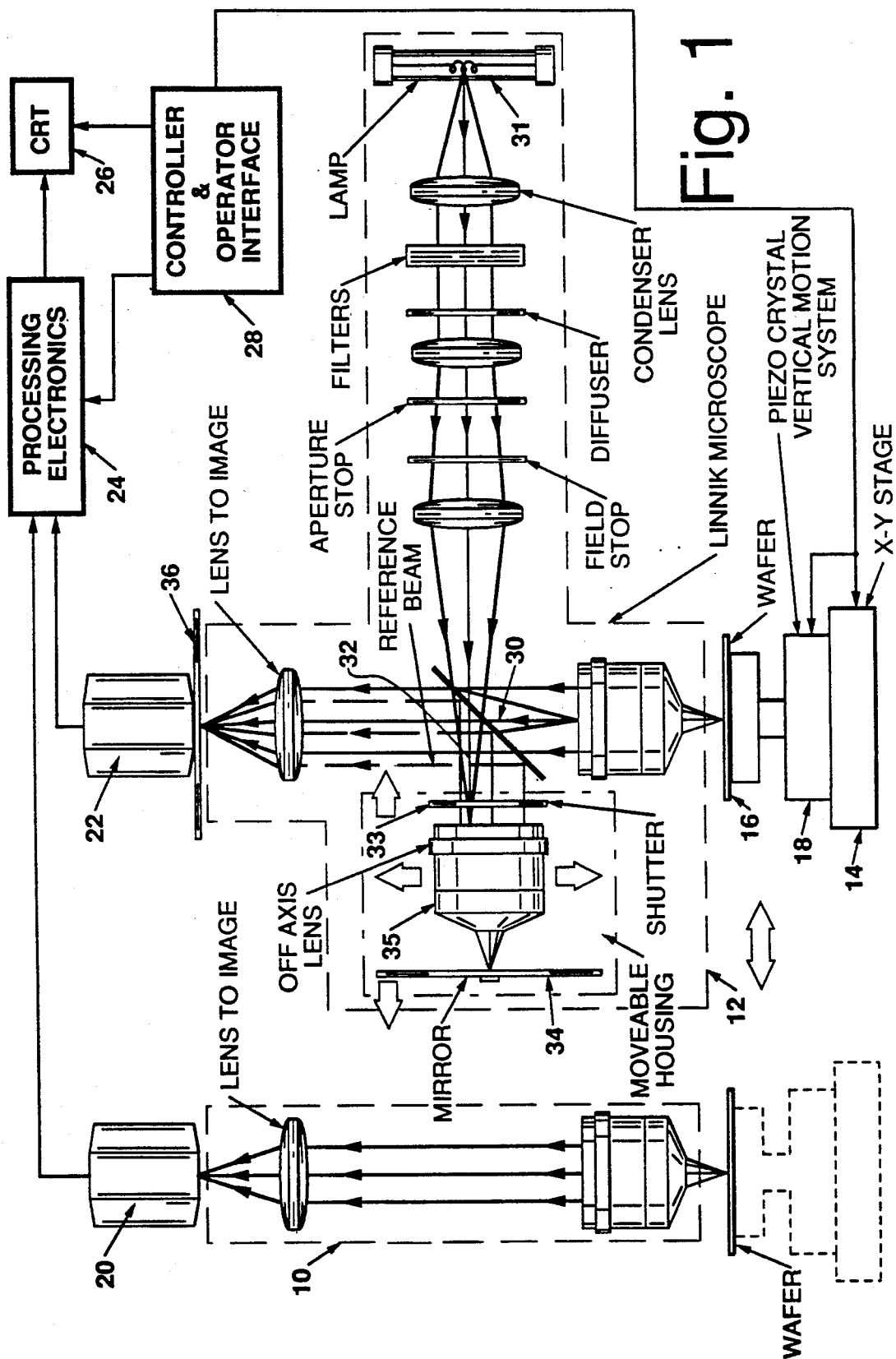
FIG. 1 is a schematic diagram depicting the basic functional components of apparatus used to implement the present invention.

A typical optical system which can be used in implementing the theories and methods of the present invention is shown in FIG. 1 to include a spotting microscope 10, a LINNIK microscope 12, and X,Y stage 14 for carrying a wafer 16 and a piezo-electric vertical motion system 18 between a set up position beneath microscope 10 and an inspection position beneath microscope 12, a pair of video cameras 20 and 22, data processing electronics 24, a CRT display 26 and an electronic controller and operator interface console 28.

In a two-beam interference microscope (such as the LINNIK microscope), a light wave from a source 31 reaching the image plane 36 is the sum of two constituent waves; one reflecting off the surface of the object 16, and the other reflecting off the surface of a reference mirror 34. Fringes are seen in the image at 36, even when white light is used to illuminate the object. If broad band illumination (white light) is used, strongest fringing occurs when the path difference between the reference channel 32 and the object channel 30 is very small, on the order of a fraction of the average wavelength, because the coherence length of white light is very short. When the degree of coherence is high between the reference channel and the object channel, the fringes are strong. Conversely, when the degree of coherence is low, the fringes are weak. In the preferred embodiment, white light Kohler illumination is provided by a Xenon arc lamp 31, and a shutter 33 is included to flip the reference beam in and out. The fringe rate and direction can be controlled on commercially available Linnik microscopes by moving the microscope objective in the reference channel off-axis. Accordingly, in the preferred embodiment the lens 35 is positioned to make the fringes which appear at image plane 36 have as close as possible to infinite fringe spacing.

The Linnik microscope of FIG. 1 is only one of many possible optical configuration which can be used in conjunction with electronics to form a coherence probe microscope. Virtually any interference microscope could be used for this purpose.

BASIC THEORY

The vector theory of the coherence probe microscope is as follows:

The power flux at the camera in FIG. 1 is:

$$I(x) = <|E_o(x) + E_r(x)|^2> \qquad 1.1$$

where $<>$ denotes time or ensemble average.

Expanding, this becomes:

$$I(x) = <|E_o(x)|^2 + |E_r(x)|^2 + 2Re(E^*_o(x) \cdot E_r(x))> \qquad 1.2.$$

The coherence probe intensity is by definition:

$$I_{CPM}(x) = |<E^*_o(x) \cdot E_r(x)>|^2 = (Re<E^*_o(x) \cdot E_r(x)>)^2 + (Im<E^*_o(x) \cdot E_r(x)>)^2 \qquad 1.3.$$

The Electric field is decomposed into orthogonal polarization states.

$$E(x,t) = \int \frac{d^3k}{(2\pi)^3} \sum_{\lambda=1}^{2} \epsilon_\lambda(k) E_\lambda e^{i(k \cdot x - \omega t)}; \ \omega = c|k| \qquad 1.4$$

Figure 2:
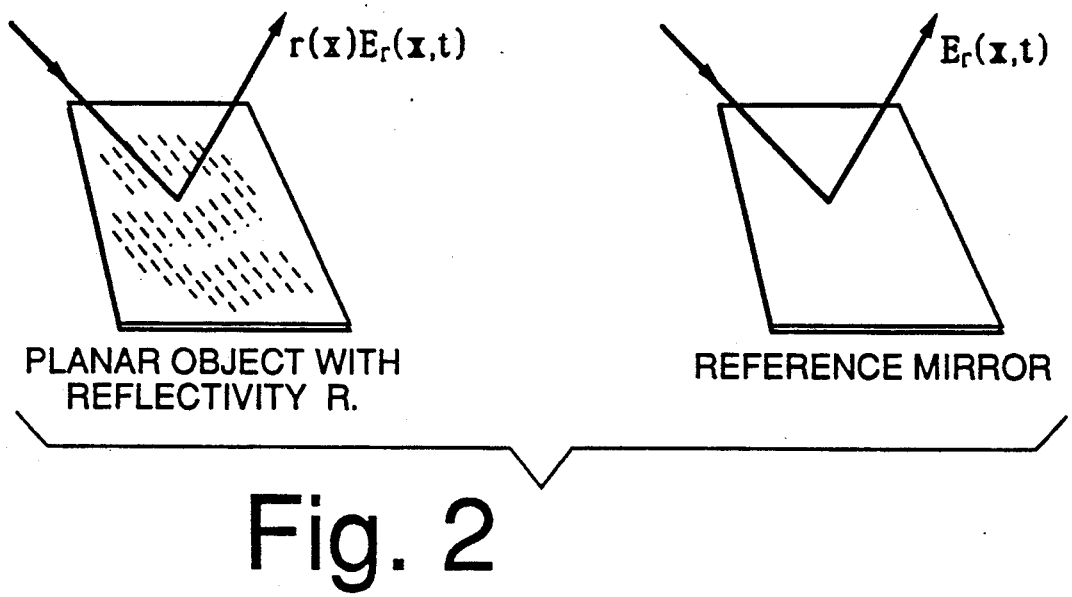
FIG. 2 is an illustration of a planar object.

Now, consider a planar object which has a simple reflectivity as is illustrated in FIG. 2.

The electric field scattered off the object must satisfy the boundary condition:

$$\lim_{z \to 0_+} E_o(x,t) = r(x) \lim_{z \to 0_+} E_r(x,t) \qquad 1.5$$

Temporarily considering the quasi-monochromatic case where each k has a slightly different frequency, or equivalently a random phase, the scattered electric field away from z=0 may be calculated by using the formula:

$$E_o(x_\perp, z, t) = \int \frac{d^2 k_\perp}{(2\pi)^2} e^{i\omega(k_\perp)t} e^{i(k_\perp \cdot x_\perp)} e^{i\sqrt{\left(\frac{\omega}{c}\right)^2 - k_\perp^2} z} \times \int d^2 x'_\perp e^{-i(k_\perp \cdot x'_\perp)} r(x'_\perp) E_r(x'_\perp, 0) \qquad 1.6$$

This formula is equivalent to:

$$E_o(x_\perp, z, t) = \int d^2x'_\perp G(x_\perp - x'_\perp; z) r(x'_\perp) E_r(x'_\perp, t) \quad 1.7$$

where $$G(x_\perp - x'_\perp; z) = \quad 1.8$$

$$\int \frac{d^2k_\perp}{(2\pi)^2} e^{ik_\perp \cdot (x_\perp - x'_\perp)} e^{i\sqrt{\left(\frac{\omega}{c}\right)^2 - k_\perp^2}} z\theta\left(\left(\frac{\omega}{c}\right)^2 - k_\perp^2\right)$$

When the field is reimaged by a microscope, the result is (ignoring trivial magnification changes for simplicity):

$$E_o(x_\perp, t) = \int d^2x'_\perp G(x_\perp - x'_\perp; 0) r(x'_\perp) E_r(x'_\perp, t) \quad 1.9.$$

So, the mutual coherence may be written:

$$<E^*_o(x_\perp, t) \cdot E_r(x_\perp, t)> = \int d^2x'_\perp G(x_\perp - x'_\perp; 0) r(x'_\perp)$$
$$\times <E^*_r(x'_\perp, t) \cdot E_r(x_\perp, t)> \quad 1.10$$

In order to proceed the mutual coherence of the illuminating field must be calculated:

$$<E^*_r(x'_\perp, t) \cdot E_r(x_\perp, t)>$$

As shown in FIG. 3, for illumination filling the back aperture uniformly, $$<E(x, z, t) \cdot E^*(0, 0, t)> = \int d^2\vec{k}_\perp e^{i\vec{k}_\perp \cdot \vec{x} - ikz} \theta((NA \cdot k_0)^2 - k_\perp^2) = G(x, z) \quad 1.11$$

and this is the same result as in the scalar approximation. So, the resulting mutual coherence is:

$$<E^*_o(x_\perp, t) \cdot E_r(x_\perp, t)> = \int d^2x'_\perp (G(x_\perp - x'_\perp; 0))^2 r(x'_\perp) \quad 1.12$$

And the coherence probe signal is consequently:

$$I_{CPM} = |<E_o^*(x_\perp, t) \cdot E_r(x_\perp, t)>|^2$$
$$= |\int d^2x'_\perp (G(x_\perp - x'_\perp; 0))^2 r(x'_\perp)|^2 \quad 1.13$$

The point spread function is consequently:

$$PSF(x) = (G(x))^4 \quad 1.14.$$

A GENERAL THEORY OF IMAGING FOR ARBITRARY OBJECTS

Figure 4:
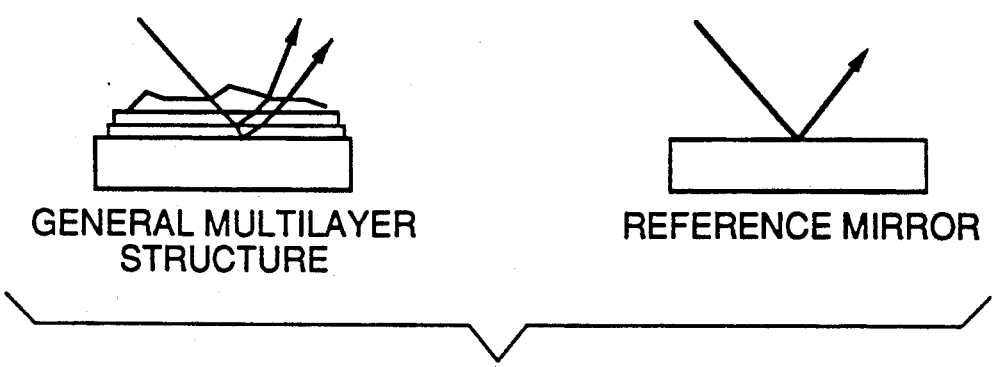
FIG. 4 shows a multilayer structure.

For nonplanar objects, such as the general multilayer structure illustrated in FIG. 4, the scattering of light may be described by a linear functional. Instead of a simple multiplicative function, the response becomes a linear matrix functional:

$$r(x)E_r^i(x, 0) \to \int d^3x' R_j^i(x, x') E_r^j(x', 0) \quad 1.15$$

$$E_o^i(x_\perp, z, t) = \quad 1.16$$

$$\int d^2x'_\perp G(x_\perp - x'_\perp; z) \times \int d^3x'' R_j^i(x'_\perp, x'') E_r^j(x'', 0)$$

The mutual coherence can then be calculated:

$$<E_o^*(x_\perp, t) \cdot E_r(x_\perp, t)> = \quad 1.17$$

-continued $$\int d^2x'_\perp d^3x'' G(x_\perp - x'_\perp; 0) \sum_{i,j} R_j^i(x'_\perp, x'') <E_r^{*i}(x'', 0) E_r^j(x, 0)>$$

Where now the correlation between the electric fields is given by:

$$<E_r^{*j}(x, t) E_r^i(y, t)> = \quad 1.18$$

$$\int d^2k_\perp e^{ik \cdot (x - y)} \theta((NA \cdot k_0)^2 - k_\perp^2) \times [\delta^{ij} - k^i k^j / k^2]$$

Which follows from the well known identity satisfied by the polarization basis vectors:

$$\sum_{\lambda=1}^{2} \epsilon_\lambda^{*i}(\vec{k}) \epsilon_\lambda^j(\vec{k}) = [\delta^{ij} - k^i k^j / k^2] \quad 1.19$$

THE SCALAR WAVE APPROXIMATION

It is common in optics to ignore the vector nature of the electromagnetic field and to treat it as a scalar field. From above it can be seen that this is a good approximation for a planar object, but is not generally a good approximation for a general object because of the potential for strong polarization dependence in Eq. 1.17.

When the scalar wave approximation is made, the following replacements are made:

$$E_r(x, t) \to U_r(x, t)$$

$$<E^*_r(x, t) \cdot E_r(y, t)> \to <U^*_r(x, t) U_r(y, t)>$$

and etc. for other forms.

The scalar wave approximation for the coherence probe microscope is probably less valid than for other microscopes because of Eq. 1.17. Polarization differences between the object and reference wave can substantially reduce the signal, unlike other microscopes. Of course matching the reference to the object can improve the validity of the approximation.

THE THEORY OF THE COMPLEX PLANE ORIGIN SHIFTING

The basic formula for a coherence probe image is:

$$I_{CPM}(x) = |<E^*_o(x) \cdot E_r(x)>|^2 = (Re<E^*_o(x) \cdot E_r(x)>)^2 + (Im<E^*_o(x) \cdot E_r(x)>)^2 \quad 2.1.$$

The idea of complex origin shifting is to add one or more fixed points to the mutual coherence before taking absolute values. That is:

$$\tilde{I}_{CPM}(x) = \left| <E^*_o(x) \cdot E_r(x)> + \sum_i a_i <E^*_o(x_i) \cdot E_r(x_i)> \right|^2 \quad 2.2$$

In the simplest case only one term in the sum is used:

$$I_{CPM}(x) = |<E^*_o(x) \cdot E_r(x)> + a<E^*_o(x_i) \cdot E_r(x_i)>|^2 \quad 2.3.$$

For linewidth measurements, this transformation offers several important advantages. It amounts to a translation of the origin of the complex plane.

The mutual coherence terms on the rhs of 2.3 are complex numbers, they have a phase and an amplitude. The two degrees of freedom are the strength parameter and the position of the fixed term $x_i$.

TECHNICAL ADVANTAGES DERIVED FROM SHIFTING THE ORIGIN OF THE COMPLEX PLANE

Figure 5A:
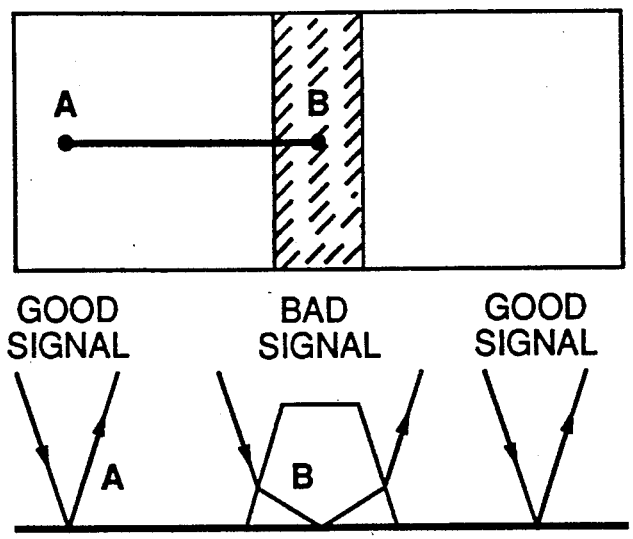
FIGS. 5a-5c are diagrams showing the advantage of shifting the origin in the complex coherence plane.

The advantage of shifting the origin in the complex plane as in Eq. 2.2 or Eq. 2.3 occurs when measuring linewidths of transparent lines on semiconductor devices. In such a problem, the mutual coherence, as one moves across the line in some focus plane, maps out a trajectory in the complex mutual coherence plane. FIGS. 5 and 6 illustrate a typical problem.

A common problem in optical linewidth measurement of transparent lines, such as might for example be found in photoresist applications is demonstrated in FIG. 7a. The light which goes through the sidewalls of the resist contributes a complex additive error term to the mutual coherence, so basically we have the following situation:

$$<E^*_o(x,t) \cdot E_r(y,t)> = \text{Good Signal} + \text{Bad Signal} \quad 2.4$$

and when we take the absolute value of this sum, we get distortion of the usual coherence probe image:

$$I_{CPM} = |<E^*_o(x,t) \cdot E_r(y,t)>| = |\text{Good Signal} + \text{Bad Signal}| \quad 2.5$$

Figure 5B:
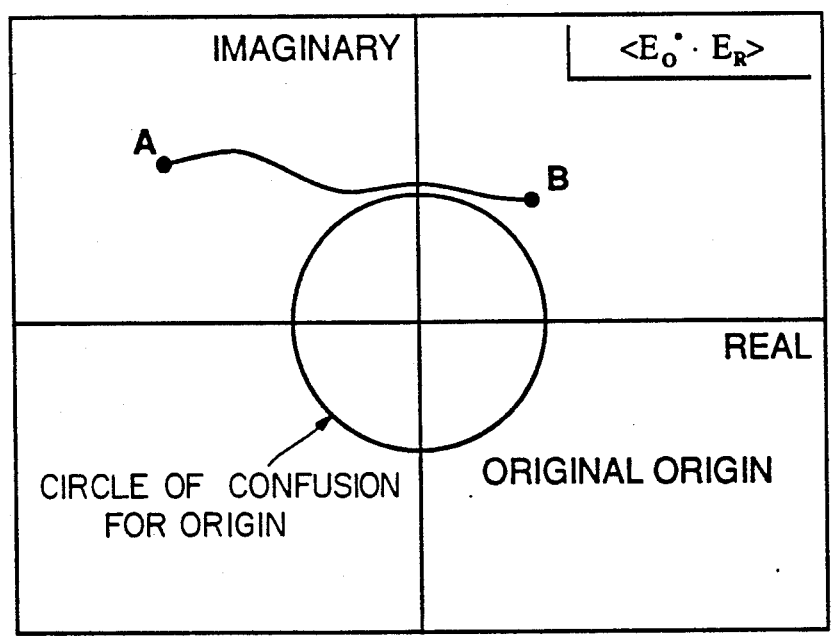
Figure 5C:
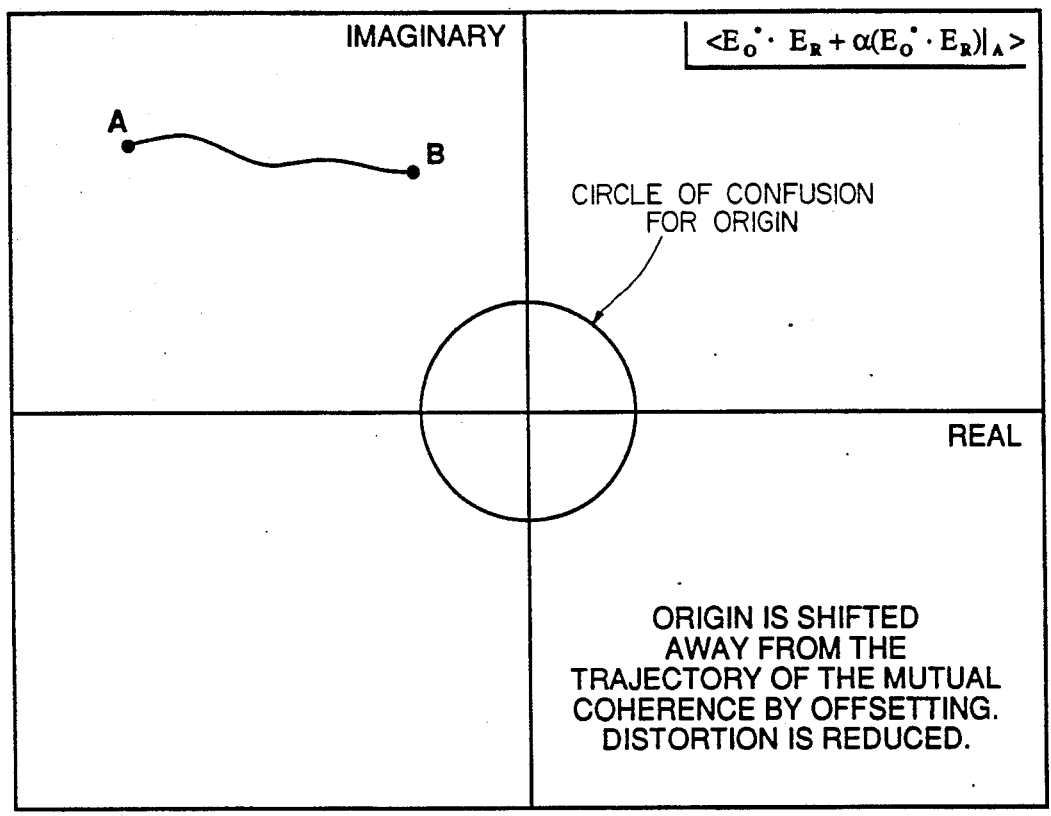

The "Bad Signal" term in these expressions is represented by the circle of confusion about the origin in FIG. 5b. FIG. 6 represents, in simplified fashion, the effect on the coherence probe signal across a line caused by just a constant bad signal in 2.4 and 2.5. It is obvious from this figure that any linewidth algorithm would be innacurate because it would tend to track the cusp of the line which is moving around as a result of this additive error term. FIG. 5c shows the improvement achieved by shifting the origin of the complex plane by adding a complex offset to the mutual coherence which can conveniently be calculated by sampling one or more points in the image.

THE PREFERRED EMBODIMENT

Figure 7:
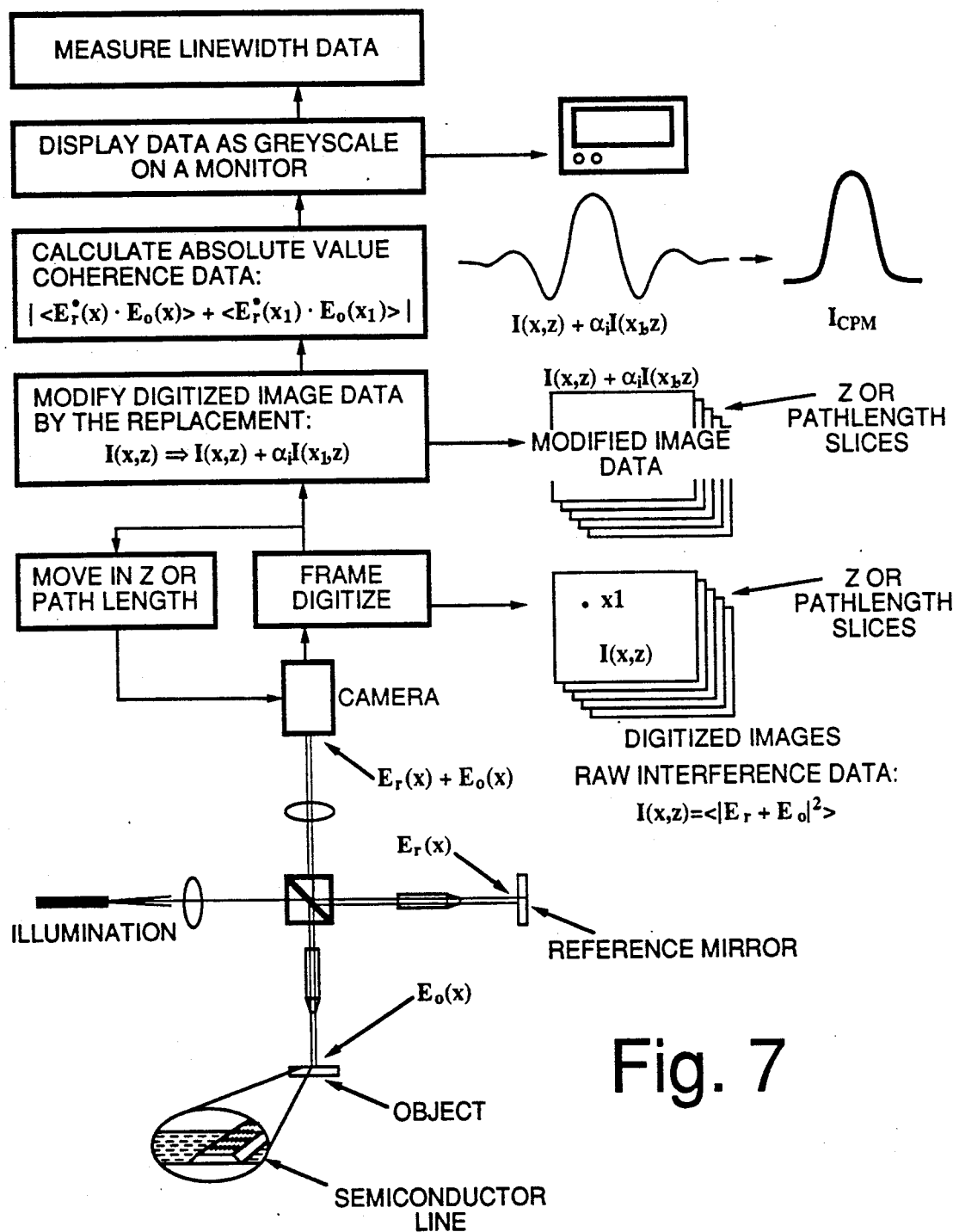
FIG. 7 is a diagram schematically illustrating a preferred embodiment of the present invention.

FIG. 7 illustrates the preferred embodiment of the present invention with

Figure 8:
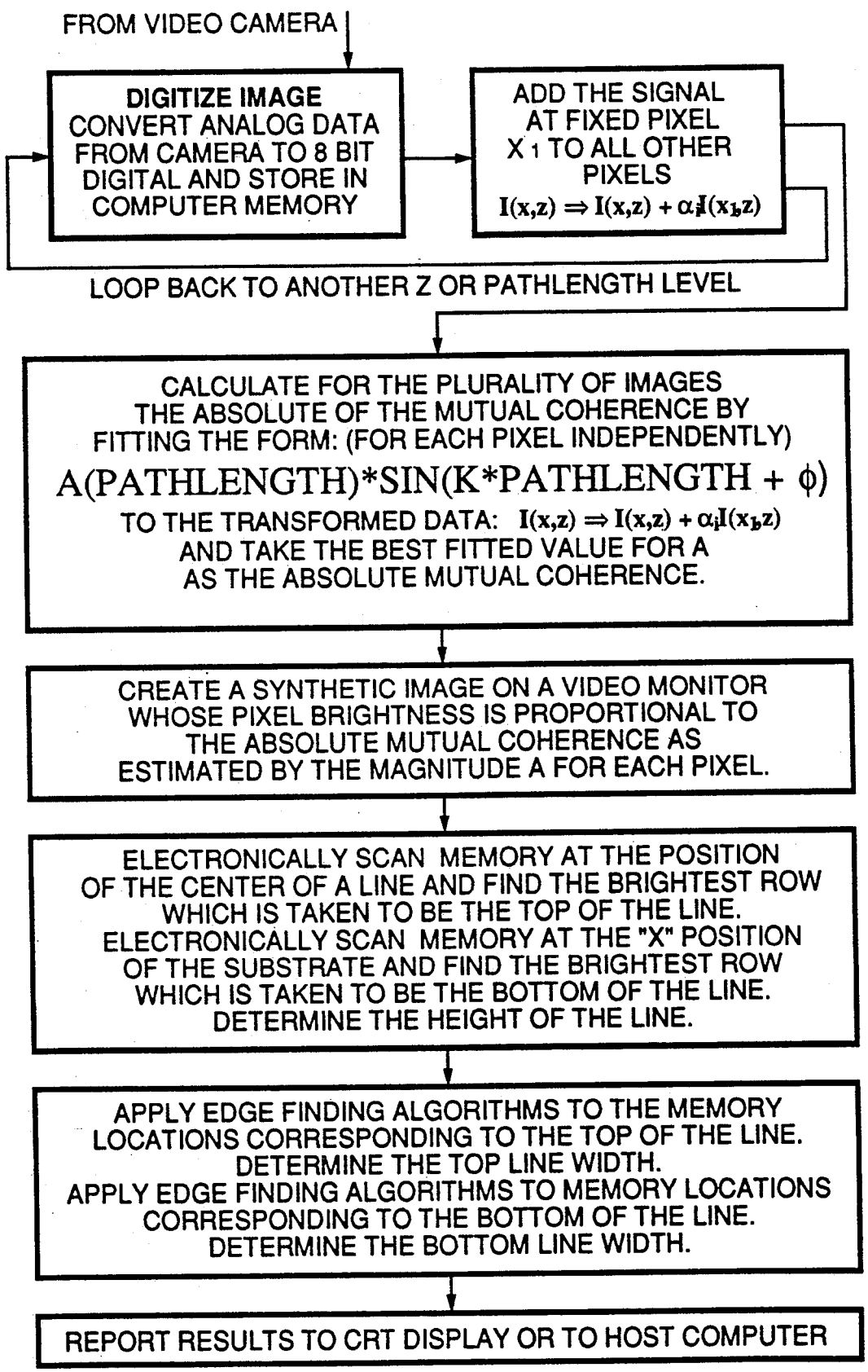
FIG. 8 is a logic flow chart showing the preferred embodiment algorithm flow.

FIG. 8 illustrating the preferred algorithm flow.

Figure 9:
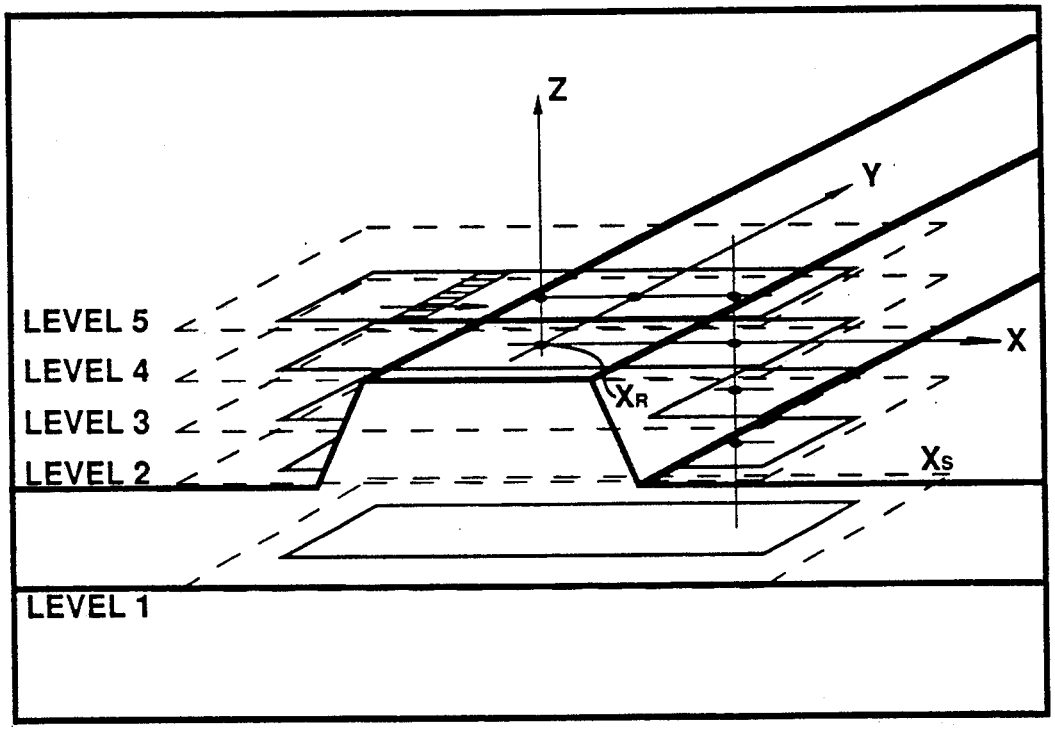
FIG. 9 is an isometric diagram illustrating an integrated circuit line and five inspection levels.

First, multiple images are obtained using an interference microscope, such as is illustrated in FIG. 1, at either different z positions as illustrated in FIG. 9, or with different optical pathlengths, or both. The digitized images contain data equal to:

$$\tilde{I}(x,z) = <|E_r(x)+E_o(x)|^2> \quad 3.1$$

Next, the origin of the complex plane is shifted by selecting one or more points xi and by calculating the following function for the different image planes:

$$\tilde{I}(x,z) = I(x,z) + \sum_{i=1}^{N} a_i I(x_i, z + \Delta) \quad 3.2$$

where the $x_i$ are the fixed points used for the transformation, and $\Delta$ is an optional z (or pathlength) offset. If pathlength is varied instead of z, then z in these formulas would be replaced by pathlength.

This data is then used to calculate the modified coherence probe data:

$$I_{CPM}(x,z) = \quad 3.3$$

$$\left| <E_r^*(x,z) \cdot E_o(x,z)> + \sum_{i=1}^{N} a_i <E_r^*(x_i, z+\Delta) \cdot E_o(x_i, z+\Delta)> \right|$$

Figure 10:
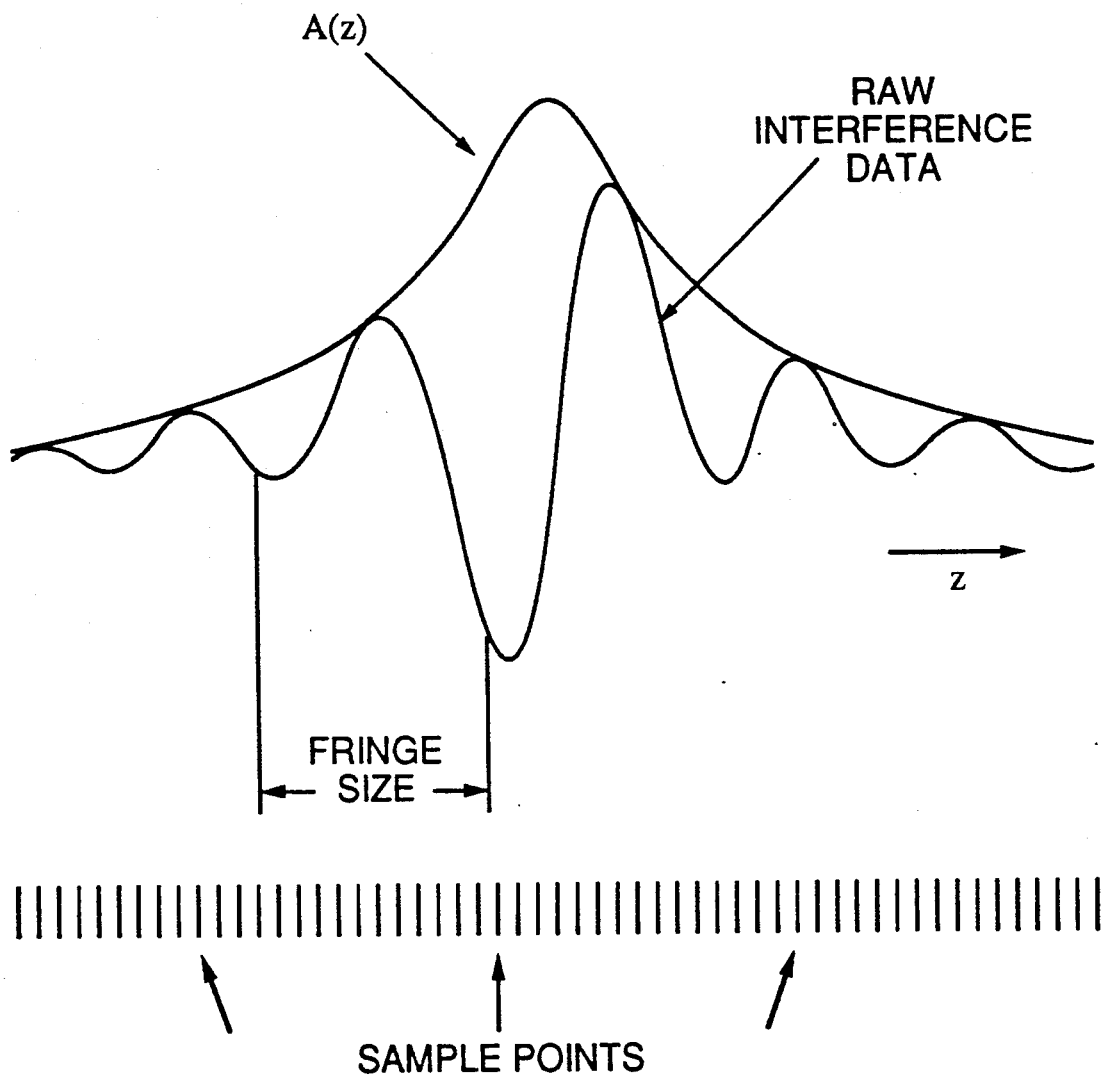
FIG. 10 is a diagram showing the calculation of absolute coherence data.

There are a number of algorithms which can be used to do this. The problem is to calculate the absolute value from the real part data. One class of techniques is to model the data in a neighborhood of z for fixed x as:

$$\tilde{I}(x,z) = \text{constant} + A(x,z) \sin(kz+\Phi) \quad 3.4$$

as is illustrated in FIG. 10. And then the modified coherence probe image is given by:

$$\tilde{I}_{CPM}(x,z) = A(x,z) \quad 3.5$$

This data is then displayed on a CRT or other electronic display, with the greyscale derived from A:

$$\text{Greyscale}(x,z) = F(A(x,z)) \quad 3.6$$

Where F is an arbitrary display function.

Finally, the modified coherence probe image data is used to measure the linewidth of a semiconductor line by means of an algorithm implemented electronically.

AN ALTERNATE EMBODIMENT

Figure 11:
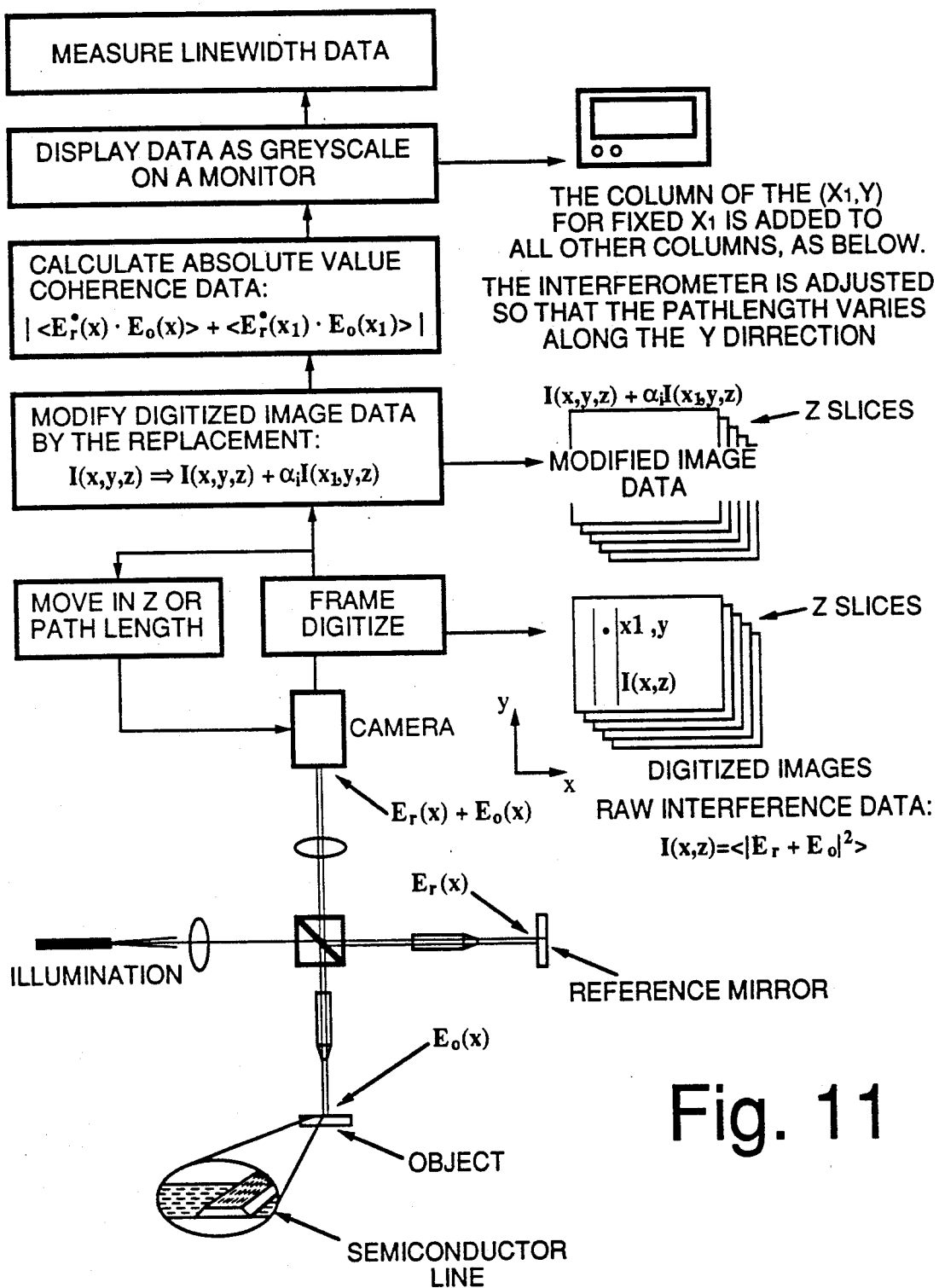
FIG. 11 is a diagram schematically illustrating an alternative embodiment of the present invention.
Figure 12:
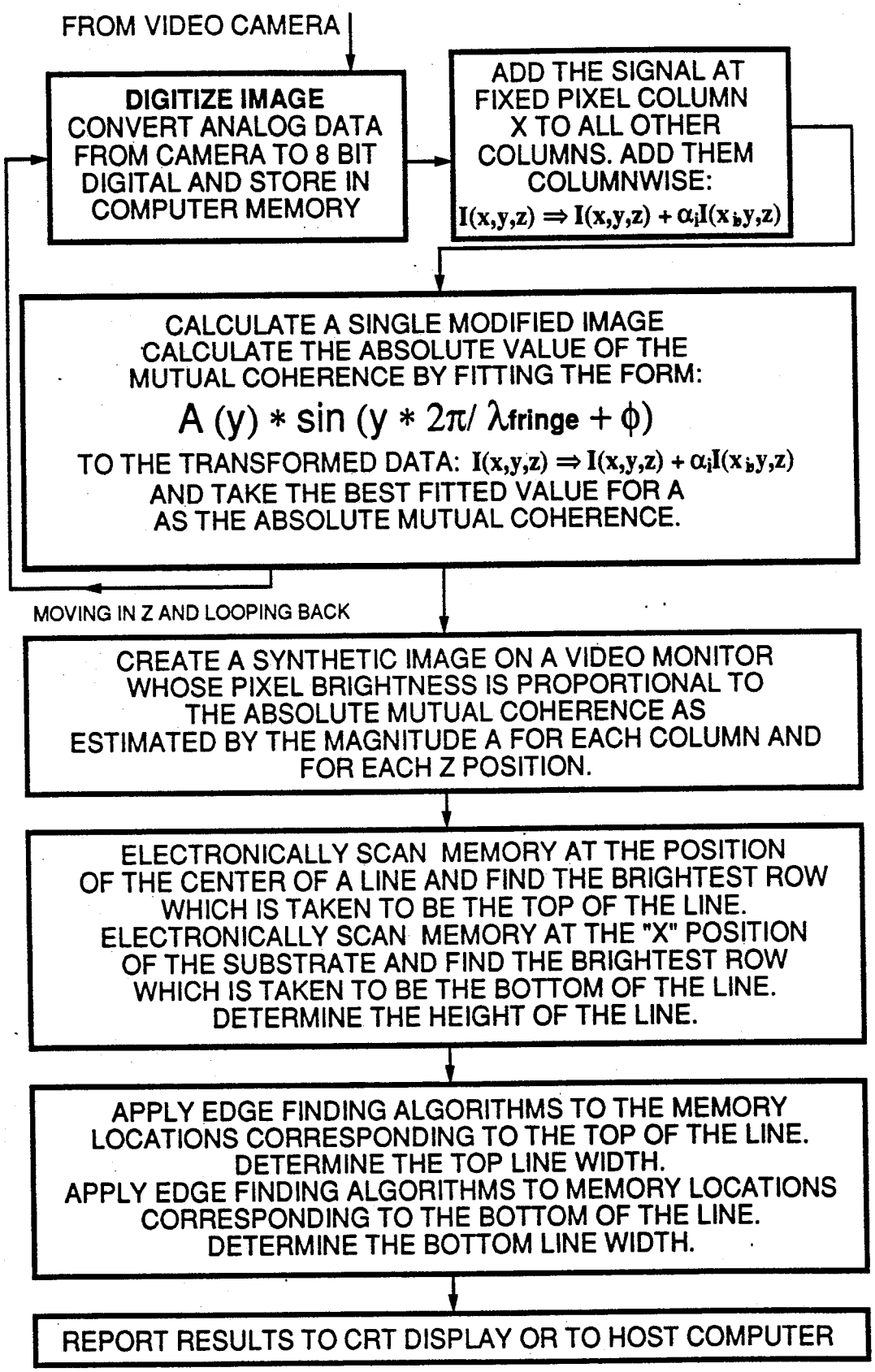
FIG. 12 is a logic flow chart showing the algorithm flow of the alternative embodiment.

FIG. 11 illustrates an alternate embodiment of the present invention with FIG. 12 illustrating the preferred algorithm flow.

The interferometer is adjusted so that fringes occur at a convenient fringe rate across the field of view of the interference microscope. Then the line to be measured is oriented perpendicular to the fringes. With this situation, with only one image frame all the data needed to calculate the absolute coherence for each pixel is obtained. A scan must still be made in z to scan through all the focus positions of the object as in FIG. 2. But for each z position, the absolute coherence calculation can be performed using only data from that level and not requiring data from other levels. This technique has the advantage of being less sensitive to vibration, but the disadvantage of being able to measure only lines in one orientation within the field.

If the direction of symmetry along the line is denoted by y, and the scan direction by x, then the fringes are parallel to x, and the phase changes at it's maximum rate in the y direction in the image. Consider an MxN array in the x-y plane. Within a column of this array, in the y direction, the pixels are sampled at different pathlength differences, but at effectively the same point in the object, owing to the symmetry along the line being measured.

First, an image is digitized at a starting z position. The digitized image contains data equal to:

$$I(x,y,z) = <|E_r(x)+E_o(x)|^2> \quad 4.1$$

Next, the origin of the complex plane is shifted by selecting one or more columns and adding them columnwise to the other columns with weighting factors, as follows:

$$\tilde{I}(x,y,z) = I(x,y,z) + \sum_{i=1}^{N} a_i I(x_i,y,z) \quad 4.2$$

where the $x_i$ are the fixed points used for the transformation of the columns. The pathlength varies along the y direction.

This data is then used to calculate the modified coherence probe data:

$$\tilde{I}_{CPM}(x,z) = \qquad 4.3$$

$$\left| <E_r^*(x,z) \cdot E_o(x,z)> + \sum_{i=1}^{N} a_i <E_r^*(x_i,z+\Delta) \cdot E_o(x_i,z+\Delta)> \right|$$

There are a number of algorithms which can be used to do this. The problem is to calculate the absolute value from the real part data. One class of techniques is to model the data in a neighborhood of z for fixed x as:

$$\tilde{I}(x,y,z) = \text{constant} + A(x,z) \sin(kz + y \cdot (2\pi/\lambda_{fringe})) \qquad 4.4$$

as is illustrated in FIG. 10. And then the modified coherence probe image is given by:

$$\tilde{I}_{CPM}(x,z) = A(x,z) \qquad 4.5.$$

This data is then displayed on a CRT or other electronic display, with the greyscale derived from A:

$$\text{Greyscale}(x,z) = F(A(x,z)) \qquad 4.6.$$

Where F is an arbitrary display function.

Finally, the modified coherence probe image data is used to measure the linewidth of a semiconductor line by means of an algorithm implemented electronically.

Although the present invention has been illustrated in a preferred embodiment and an alternate embodiment, it is anticipated that following a reading of this disclosure numerous alterations and modifications thereof will become apparent to those skilled in the art. It is therefore intended that the appended claims be interpreted as covering all such embodiments as fall within the true spirit and scope of the invention.

What is claimed is:

1. A method of inspecting an object and generating synthetic image data comprising the steps of:
    (a) using an interference optical system including an object channel and a reference channel for simultaneously inspecting an object and a reflective reference surface and developing a plurality of images formed by the interference between object wave energy passing from said object and through said object channel to an image plane and reference wave energy passing from said reference surface and through said reference channel to said image plane, each said image being formed in response to a change in position of either said object or said reference surface;
    (b) modifying each of the plurality of images by adding the intensity from a fixed selected point of the images to all the other points with a weighting factor to produce a modified plurality of images;
    (c) determining for each modified image the absolute value of the coherence between said object wave energy and said reference wave energy; and
    (d) using said absolute value coherence data to generate synthetic image data representative of a particular characteristic of said object, wherein the brightness of each pixel element of a synthetic image developed using said synthetic image data is proportional to said absolute value coherence data.

2. A method of inspecting an object and generating synthetic image data comprising the steps of:
    (a) using an interference optical system including an object channel and a reference channel for simultaneously inspecting an object and a reflective reference surface and developing a plurality of images formed by the interference between object wave energy passing from said object and through said object channel to an image plane and reference wave energy passing from said reference surface and through said reference channel to said image plane, each said image being formed in response to a change in position of either said object or said reference surface;
    (b) modifying each of the plurality of images by adding columnwise the intensity from a fixed selected column of points of the images to all the other points with a weighting factor to produce a modified plurality of images;
    (c) determining for each image of the modified set the absolute value of the coherence between said object wave and said reference wave energy; and
    (d) using said absolute value coherence data to generate synthetic image data representative of a particular characteristic of said object, wherein the brightness of each pixel element of a synthetic image developed using said synthetic image data is proportional to said absolute value coherence data.

3. A method of inspecting an object and generating synthetic image data comprising the steps of:
    (a) using an interference optical system including an object channel and a reference channel for simultaneously inspecting an object and a reflective reference surface and developing a plurality of images formed by the interference between object wave energy passing from said object and through said object channel to an image plane and reference wave energy passing from said reference surface and through said reference channel to said image plane, each said image being formed in response to a change in position of either said object or said reference surface;
    (b) modifying each of the plurality of images by adding a weighted sum of the intensities from a fixed set of selected points of the images to all the other points to produce a modified plurality of images;
    (c) determining for each modified image the absolute value of the coherence between said object wave energy and said reference wave energy; and
    (d) using said absolute value coherence data to generate synthetic image data representative of a particular characteristic of said object, wherein the brightness of each pixel element of a synthetic image developed using said synthetic image data is proportional to said absolute value coherence data.

4. A process for generating synthetic image data representative of a cross-section of an at-least partially reflective irregular surface of an object formed by a portion of a semiconductor wafer having an elongated strip of raised surface extending therethrough, comprising the steps of:
    (a) illuminating the irregular object surface with light from a source of illumination;
    (b) illuminating a reflective reference surface with light from said source of illumination, said reference surface being formed by an optically flat mirror;

(c) collecting object light reflected from said object surface and directing said object light along a first optical axis;

(d) collecting reference light reflected from said reference surface and directing said reference light along a second optical axis at least a portion of which is parallel to said first optical axis;

(e) focusing the light directed along said first and second optical axes to form a fringed image pattern resulting from interference of said object light and said reference light;

(f) orientating said wafer so that a selected scan line may be directed substantially orthogonal relative to the length of said elongated strip;

(g) modifying the scan data by adding to each pixel's intensity the weighted sum of intensities of a set of other pixels;

(h) incrementally changing the position of said object along said first optical axis, each time repeating steps (a) through (e) and (g);

(i) inspecting the said modified image patterns to develop a series of absolute coherence data along said scan line;

(j) processing the plurality of series of coherence data to develop synthetic image data corresponding to a cross-sectional profile of said object surface taken in a plane including said selected scan lines;

(k) displaying said synthetic image data to visually depict a cross-sectional profile of said object surface taken in the plane including said scan lines; and (l) determining the position of said object along said first optical axis at which the value of said coherence data corresponding to the crossing of a first particular scan line over said raised surface is at a maximum relative to the corresponding coherence data of the other scan lines and identifying this position as corresponding to the top surface of said strip.

5. A process as recited in claim 4, and further comprising the step of;

(m) detecting the width of the top said raised surface by measuring the length of the portion of said first particular scan line over which said coherence data is at a maximum.

6. A process as recited in claim 5, and further comprising the step of;

(n) determining the position of said object along said first optical axis when the value of said coherence data corresponding to the crossing of another particular scan line over portions of said surface other than said raised surface are at a maximum relative to the corresponding data of the other scanned lines; and (o) determining the width of the base of said raised surface by measuring the separation between the portions of said other particular scan lines over which said data is at a maximum.

7. A process as recited in claim 6, and further comprising the step of;

(p) determining the height of said raised surface above the adjacent wafer surface by measuring the distance between the position at which the object is positioned along said first optical axis when the width of the top of said raised surface is detected and the position along said first optical axis when the width of the base of said raised surface is detected.

8. A process as recited in claim 7, and further comprising the step of;

(q) calculating the slopes of the side walls of said raised surface, in the plane including said scan lines, as a function of the height of the top of the raised surface above the base thereof and the difference in width of the top and the base along the corresponding scan lines.

9. A method of measuring certain dimensions of an elongated strip of raised surface formed on an object, such as a semiconductor wafer or photomask, using an interference optical system to develop images formed by interference between object wave energy passing from the object and through and object channel to an image plane and reference wave energy passing through a reference channel to the image plane, comprising the steps of:

(a) illuminating the object surface with light from a source of illumination;

(b) illuminating a reflective reference surface with light from said source of illumination;

(c) collecting object light reflected from said object surface and directed along a first optical axis through said object channel;

(d) collecting reference light reflected from said reference surface and directed along a second optical axis through said reference channel, said second optical axis having at least a portion thereof which is parallel to said first optical axis;

(e) focusing the light directed along said parallel portions of said first and second optical axes onto an image plane to form an interference image pattern resulting from interference of said object light and said reference light;

(f) inspecting the image pattern by detecting the light intensity at each pixel in an array of mxn pixels extending across the image of said strip to produce pixel data;

(g) modifying the array of mxn pixels by adding to each pixel's intensity a weighted sum of intensities of a set of other pixels;

(h) incrementally changing the position of said object along said first optical axis, each time repeating steps (a) through (g);

(i) scanning the modified pixel data and calculating therefrom coherence data representing the absolute value or magnitude of the complex coherence between the light from the reference channel and that from the object channel and storing the calculated coherence data for subsequent reference; and (j) using the stored coherence data to generate data from which a synthetic image corresponding to a transverse cross-section of the measured strip may be developed.

10. A method as recited in claim 9 and further including the step of:

(k) inspecting the stored coherence data to determine the height of the top surface of said strip relative to the adjacent surface of said object, such height being measured by determining a first position along said first optical axis at which maximum coherence occurs at a point in an array corresponding with said top surface, and by determining a second position along said first optical axis at which maximum coherence occurs at a point in an array corresponding with said adjacent surface, the measured height of said top surface being equal to the distance between said first position and said second position.

11. A method as recited in claim 9 further including the step of:
(k) measuring the width of the bottom of the strip by applying an edge finding algorithm to coherence data taken from the image corresponding to said adjacent surface without first calculating the height of said top surface and without first calculating the width of the top of said object.

12. A method as recited in claim 10 and further comprising the step:
(j) of determining the width of the top surface of said strip by applying an edge finding algorithm to coherence data taken from the image corresponding to said top surface.

13. A method as recited in claim 10 and further comprising the step of:
(j) measuring the width of the bottom of the strip by applying an edge finding algorithm to coherence data taken from the image corresponding to said adjacent surface.

14. A method as recited in claim 13 and further comprising the step of:
(k) of determining the width of the top surface of said strip by applying an edge finding algorithm to coherence data taken from the image corresponding to said top surface.

* * * * *